Sept. 16, 1952        H. L. READING        2,611,048
BRAKE FLUID LEAK DETECTOR

Filed Jan. 26, 1949        2 SHEETS—SHEET 1

Inventor
Harry L. Reading

By Clarence A. O'Brien
and Harvey B. Jacobson
Attorneys

Sept. 16, 1952 H. L. READING 2,611,048
BRAKE FLUID LEAK DETECTOR
Filed Jan. 26, 1949 2 SHEETS—SHEET 2

Inventor
Harry L. Reading
By Clarence A. O'Brien
and Harvey B. Jacobson
Attorneys Patented Sept. 16, 1952

2,611,048

UNITED STATES PATENT OFFICE 2,611,048

BRAKE FLUID LEAK DETECTOR

Harry L. Reading, Flemington, N. J.

Application January 26, 1949, Serial No. 72,876

1 Claim. (Cl. 200—84)

This invention relates to new and useful improvements in signalling devices and the primary object of the present invention is to provide a mechanism for indicating a leak in the brake line of a hydraulically operated brake system.

Another important object of the present invention is to provide a brake fluid leak detector including a novel and improved float operated switch actuating mechanism that is responsive to the brake fluid level in a supply tank.

Yet another object of the present invention is to provide a switch operator connected to and operated by a float and so constructed as to permit slight movement of the float, resulting from a fluid surge in the float receiving tank, without accidentally actuating the switch operator.

Another object of the present invention is to provide a brake fluid leak detector including an auxiliary supply tank operatively connected to the brake line of a vehicle and adapted to supply a braking fluid to the line should a leak be present in the line, thereby providing a safety feature since the braking system will remain operative even though some of the braking fluid has been wasted.

Another purpose of the present invention is to provide an attachment for the brake line of a vehicle that will actuate a signal mounted on the instrument panel of the vehicle when a leak is present in the brake line, and which is quickly and readily applied to or removed from the brake line in a convenient manner.

Another feature of the present invention is to provide a detector of the aforementioned character that is so constructed as to permit the same to be applied to engine side of dashboard of a vehicle in a conveniently accessible position.

A further object of the present invention is to provide a brake fluid leak detector that is extremely small and compact in structure.

A still further aim of the present invention is to provide a signal for indicating a leak in the brake line of a vehicle that is simple and practical in construction, strong and reliable in use, efficient and durable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
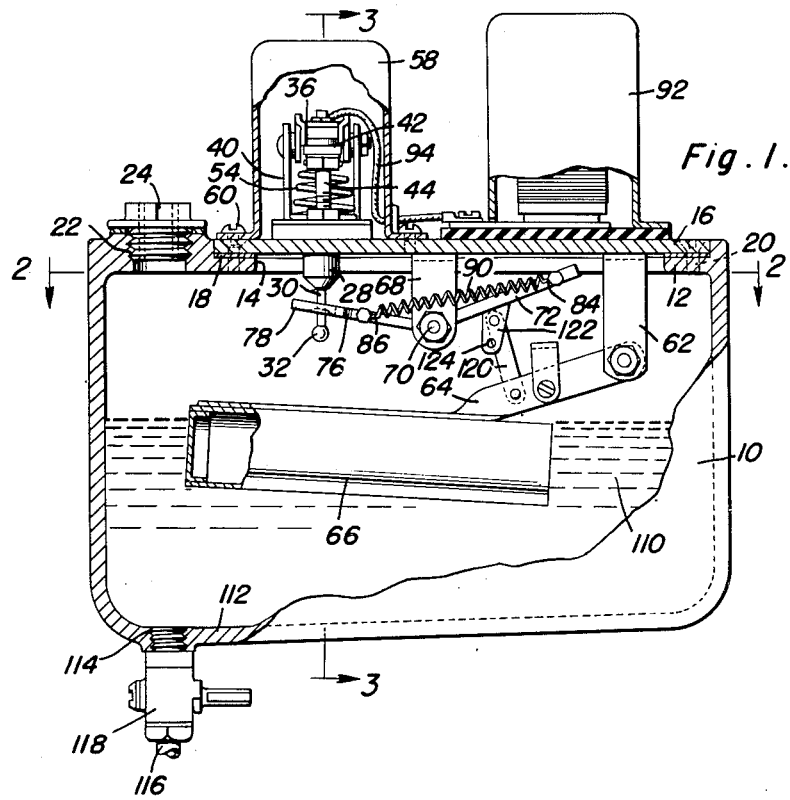
Figure 1 is a side elevational view of the present invention and with parts thereof broken away for the convenience of explanation.
Figure 2:
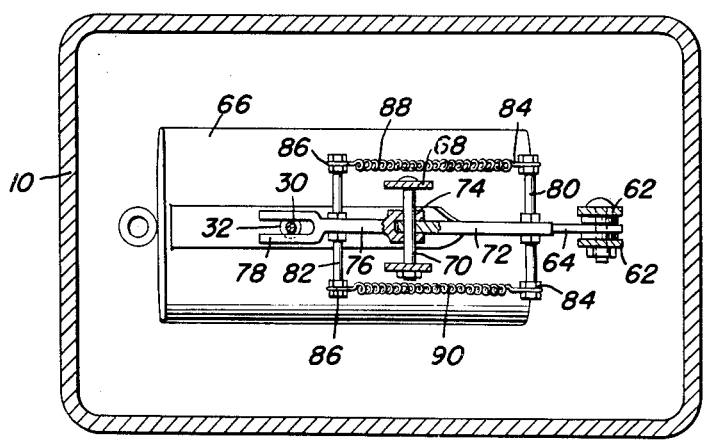
Figure 2 is a horizontal sectional view taken substantially on the plane of section line 2—2 of Figure 1.

Referring now to the drawings in detail, wherein for the purpose of illustration, there is disclosed a preferred embodiment of the present invention, the numeral 10 represents a tank or container the upper wall 12 of which is provided with an opening 14 that is closed by a removable closure plate or lid 16. The closure plate 16 is preferably seated in a recess 18 in the upper wall 12 and is secured to the upper wall 12 by fasteners or the like 20.

The upper wall 12 is also provided with an internally threaded port 22 that receivably engages a closure plug 24.

The closure plate 16 is formed with an internally threaded opening 26 in which there is threaded a headed plug 28 having an axial bore that slidably receives a switch operating member or rod 30 the lower end of which is provided with a stop 32 for a purpose which will later be more fully described.

The eye terminal 34 of a switch member or arm 36 is pivotally mounted on a shaft 38 that extends between the legs of a channel shaped bracket 40 which is secured to the closure plate 16 and the free end of the switch member 36 supports a movable contact 42 that is normally spaced from a fixed contact or bolt 44 adjustably carried by the closure plate 16. Obviously, any suitable insulation means, such as washers 46, may be associated with the plug 28 and contact 44, for sealing the openings provided in the closure plate for receiving the plug 28 and contact 44.

Adjacent the pivoted end of the switch member 36 there is provided an insulated guide sleeve 48 that receives the upper end of the rod 30 and the rod 30 is held in position to the sleeve 48 by cotter pin 50 and washer 52.

Figure 3:
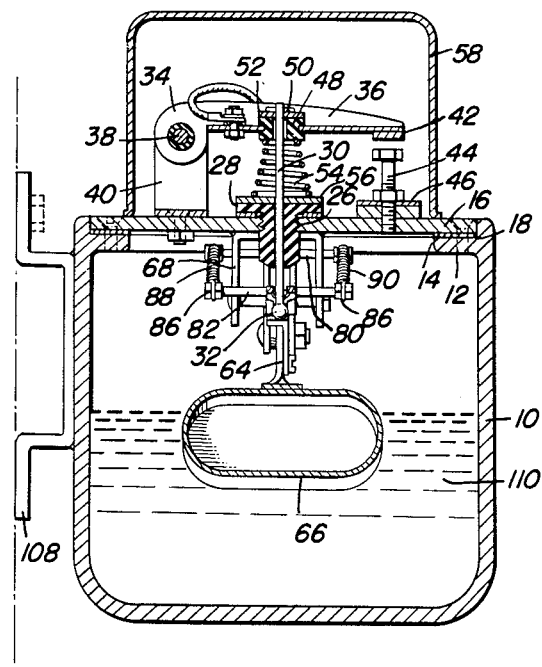
Figure 3 is a transverse vertical sectional view taken substantially on the plane of section line 3—3 of Figure 1.

A substantially conical spring member 54 embraces the rod 30 and is biased between the sleeve 48 and a wear washer 56, on the plug 28, to retain the arm 36 in a raised position with the contacts 42 and 44 spaced relative to each other as shown in Fig. 3.

The entire switch mechanism, including the switch member 36, bracket 40, contacts 42 and 44, the plug 28, sleeve 48 and spring 54 are enclosed in a housing or case 58 that is removably secured to the closure plate 16 by fasteners 60.

Suitably secured to and depending from the closure plate 16, at one end thereof, is a channel bracket 62 that pivotally supports one end of a twisted strap 64 the free end of which is secured to a suitable float 66 that is mounted in the tank 10 for substantially vertical swinging movement.

A further channel bracket 68 depends from the closure plate 16 and the legs thereof support a pivot pin or bolt 70 on which one end of an actuating arm 72 is pivoted. One bifurcated end 74 of a further arm 76 is also pivoted on the pin 70 and the pivoted end of the arm 72 is received between the furcations of the end 74. The free end 78 of the arm 76 is also bifurcated to receive the rod 30 and to engage the stop 32 in a manner presently to be explained.

Anchor rods or bolts 80 and 82 project laterally from the respective arms 72 and 76, and adjacent the free ends of said arms 72 and 76. The outer ends of the anchor rods 80 and 82 project well outwardly of the legs of the bracket 68 and are suitably secured to the end portions 84 and 86 of a pair of spring members or coil springs 88 and 90 that normally retain the arms 72 and 76 in an upwardly inclined position with the free ends thereof above the pivot pin 70 and the spring members also above the pivot pin. In this position, the end 78 of the arm 76 is spaced above the stop 32.

Detachably secured to the closure plate 16, is a suitable, well known, relay 92 that is connected to the switch member 36 by a conductor of wire 94. The relay 92 is also connected to a battery 96 or suitable source of current by conductors 98.

An electrical signal, such as a lamp bulb 100, is mounted on the instrument panel of a vehicle and the conductor 102 leading from the lamp bulb is normally spaced from a conductor 104 leading from the conductor 98.

Figure 5:
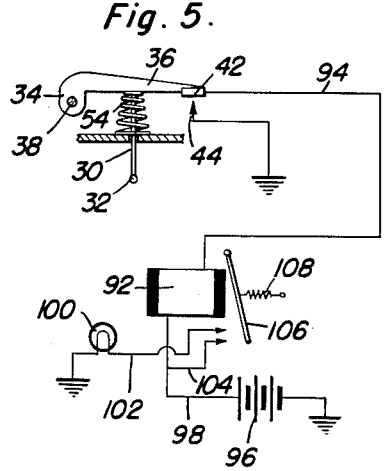
Figure 4:
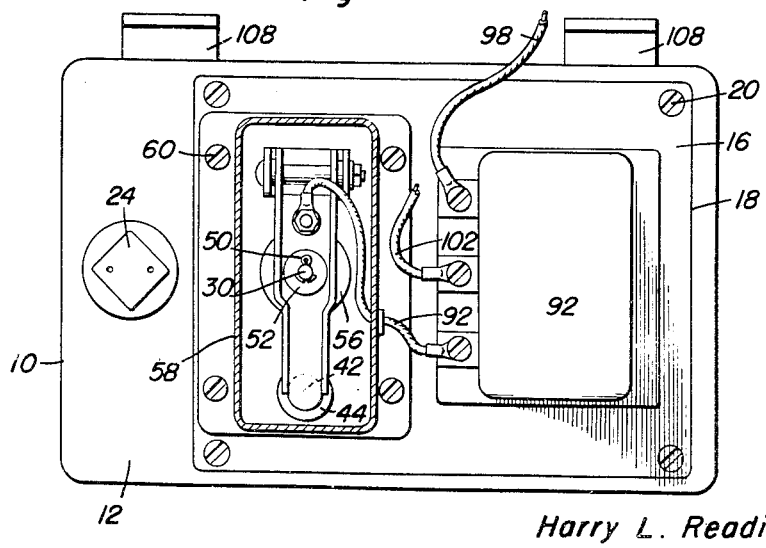
Figure 4 is a top plan view of Figure 1 and with parts of the switch housing broken away; and, Figure 5 is a schematic diagram showing the electrical circuit used in conjunction with the present invention.

A pivotal switch arm 106 opposes the relay 92 and is urged by a spring 108 from the relay until the relay has been energized by the movement of the contact 42 against the contact 44 at which time the switch arm 106 will be attracted to the relay closing the gap between conductors 102 and 104 and thereby completing a circuit to the lamp bulb 100 (see Fig. 5).

In practical use of the present invention, the tank 10 supports suitable brackets 108 that are secured to a part of a vehicle, preferably to the engine side of the dashboard in a conveniently accessible position so that a braking fluid 110 may be easily placed in the tank through the opening or port 22.

The bottom wall 112 of the tank 10 is provided with an internally threaded outlet port 114 that receives a tubing or conduit 116 that communicates with the brake line (not shown) of a vehicle and a suitable valve 118 controls the conduit 116.

When the braking fluid 110 is at the proper level in the tank 10, as shown in Figure 1, the float 66 is raised and the arms 72 and 76 are also raised, it being understood that the strap 64 is connected to the arm 72 by suitable links, for example, a link 120 pivoted at one end to the strap 64, a further link 122 fixed to the arm 72 and a pin 124 joining the free ends of the links 120 and 122. Obviously, it is preferred that the link 120 be adjustably secured to the link 122 permitting slight adjustment of the linkage.

When the elements are in the above described position, and the vehicle is riding over rough or uneven terrain, the float can move slightly without causing the arms 72 and 76 to be actuated since the springs 88 and 90 are above the pivot point 70.

If a leak occurs in the brake line, as a result of stop light switch, wheel cylinders, flexible hoses of the system, tubing being worn through by chafing from vibration, and boiling over from battery causing corrosion and eating through metal tubing or anything that may happen to cause a leak to develop in the brake system, the level of the braking fluid 110 will be lowered causing the float 66 to move downwardly.

As the float 66 moves downwardly, the arm 72 is pivoted downwardly moving its free end below the pivot pin 70 as well as the ends 84 of the springs 88 and 90 until the greater portions of the springs 88 and 90 are below the pivot pin 70 at which time the arm 76 will swing downwardly and the end 78 will engage the stop 32 to slide the rod 30 downwardly and thereby causing the switch member 36 to pivot and the contact 42 will engage the contact 44.

Obviously, the instant structure is capable of functioning in its intended mode of operation without the use of the relay 92 in which instance the wiring is changed slightly to connect the switch member, namely contacts 42 and 44, directly to the signal, which may be a sounding device or alarm as well as a visual device.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A float operated switch mechanism comprising a casing, a support mounted within the casing, first and second arms each having an inner end portion and an outer end portion, a pivot securing the inner end portions of the arms to the support, a spring terminally secured to the outer end portions of said arms and normally disposed above the pivot to retain the outer end portions of said arms raised above the pivot, a switch supported on said casing and including an operator rod, an insulating sleeve carried by the casing slidably receiving the rod, the outer end portion of said first arm being bifurcated and receiving the rod, a stop on the rod underlying the bifurcated end of said first arm, a second support within the casing, a float underlying the pivot, a strap secured to the float and including an inclined end portion, the inclined end portion of said strap being pivoted to the second support for swinging movement toward and away from the pivot, and a link connecting the inclined end portion of said strap to the second arm for lowering the outer end portion of the second arm in response to a lowering of the float within the casing.

HARRY L. READING.

REFERENCES CITED

The following references are of record in the file of this patent:

UNITED STATES PATENTS

| Number | Name | Date |
|---|---|---|
| 425,570 | Griggs | Apr. 15, 1890 |
| 721,671 | Collings et al. | Mar. 3, 1903 |
| 1,132,273 | Jay | Mar. 16, 1915 |
| 1,163,919 | Herb | Dec. 14, 1915 |
| 1,381,723 | Makoben | June 14, 1921 |
| 1,442,948 | Hutchinson | Jan. 23, 1923 |
| 1,704,761 | Plant | Mar. 12, 1929 |
| 1,760,382 | Teesdale | May 27, 1930 |
| 2,202,197 | Ewertz | May 28, 1940 |
| 2,253,260 | Alcorn | Aug. 19, 1941 |
| 2,265,309 | Philips | Dec. 9, 1941 |
| 2,278,279 | Morris | Mar. 31, 1942 |
| 2,479,503 | Moore | Aug. 16, 1949 |
| 2,494,802 | Fox | Jan. 17, 1950 |